Inventor
JOHN W. ANDERSON
ROBERT R. CHAPMAN

George H. Fisher
Attorney

FIG. 4

INVENTOR.
JOHN W. ANDERSON
ROBERT R. CHAPMAN
BY
George H Fisher
ATTORNEY

Patented Dec. 15, 1953

2,662,705

UNITED STATES PATENT OFFICE 2,662,705

AUTOMATIC PILOT

John W. Anderson, Edina, and Robert R. Chapman, Minneapolis, Minn., assignors to Minneapolis-Honeywell Regulator Company, Minneapolis, Minn., a corporation of Delaware Application August 17, 1950, Serial No. 179,982

13 Claims. (Cl. 244—77)

This invention relates to directional control apparatus for dirigible craft such as automatic pilots for aircraft.

Such apparatus is provided with stabilizing devices which maintain the attitude of the aircraft in preselected relation with respect to the axes of the craft. Such axes are termed the turn, roll, and pitch axes. Devices which stabilize or control the craft with respect to the turn axis are referred to as directional control devices.

These devices may be in the form of a free directional gyroscope, a compass responsive to the earth's magnetic field, or a gyroscope slaved to a magnetic compass, termed a gyro-magnetic compass.

It is an object of this invention to couple various direction control devices alternatively with automatic control apparatus having stabilizing means for another axis of the craft to increase the range of axis stabilization.

It is a further object of this invention to control such automatic control system from computing devices as alternative to control by said direction devices.

It is a further object of this invention to permit manual selection between a device for stabilizing the craft about the turn axis and a computer device for also controlling the craft about the turn axis.

It is a further object of this invention to provide for novel manual control of the craft about the turn axis from a station remote from the station of the pilot for the aircraft while a stabilizing device is rendered temporarily ineffective to control said craft about the turn axis during such manual control.

It is a further object of this invention to gradually relinquish directional control from a stabilizing device and gradually introduce directional control from a computing device at will.

These and further objects of the invention will become apparent upon a consideration of the following detailed description taken in conjunction with the accompanying drawing disclosing a preferred embodiment thereof.

In the drawing, Figures 1A, 1B jointly constitute a schematic form of the novel apparatus.

The form of the invention schematically illustrated in the accompanying drawing, by way of example, is a system for automatically controlling and stabilizing the attitude of an aircraft about the roll and turn axes of the craft. Control about the roll axis is provided by a conventional vertical gyroscope 174 while control about the turn axis may be effected either by a directional gyroscope 61, Figure 1A, or by magnetic compass associated control means 216, 191, 184, Figure 1B. When a directional gyroscope is utilized, it controls the system directly. On the other hand, when compass control means are utilized, motor driven means 86 controlled from the compass means are used to control the system through a normally energized magnetic clutch 182.

A remotely positioned manually operable means 90 may be utilized to directly control the system at which time the directional gyroscope is placed in a caged condition or if the system is under compass control, the magnetic clutch 182 is deenergized and spring means 88, 89 serve to return to a normal position the motor driven means 86. With the compass control means being utilized therefor, the motor driven means 86 is operated to maintain the heading or attitude about the turn axis stabilized while additionally the manual means permits change in attitude of the craft about the turn axis.

The system may, alternatively to directional gyro or compass control, be controlled from a computer. When this selection of computer control is made, the control of the system by either directional gyroscope or the compass control means is gradually diminished until it is made entirely ineffective and then the control of the system from the computer is gradually introduced from zero control to full control of the system.

For the purpose of more fully identifying the components of the system and their interrelationship a detailed description of the invention follows. Referring to the drawing which illustrates an automatic pilot system for an aircraft, the rudder (not shown) of the aircraft is operated by cables 10 (Figure 1A) extending from a cable drum 11 which in turn is driven by a rudder servomotor 12. The rudder servomotor is provided with a forward rotation clutch winding terminal 13; a reverse rotation clutch winding terminal 14; and a brake winding terminal 15. The servomotor may be of the type disclosed in the patent to Hamby 2,466,702. The three rudder servomotor terminals are connected to the out contacts of a three-pole double throw rudder engage relay 16. The rudder servomotor 12 is reversibly controlled from a rudder amplifier 31. The amplifier has alternating current power input terminals 27, 28 and alternating current signal input terminals 29 and 30. The amplifier includes amplifier relay terminals 25 and 26 which are supplied from battery 24 upon closing of either amplifier relay. The relays are operated in discriminator manner in accordance with the phase relationship of the signal voltage across signal input terminals 29 and 30 and the voltage across power input terminals 27 and 28. Amplifier 31 may be of the type disclosed in the aforesaid patent to Hamby. Terminal 25 is connected to relay arm 23 which coacts with in contact 17. Terminal 26 is connected to relay arm 22 which coacts with in contact 18. Relay arm 21 which coacts with in contact 19 is directly connected to battery 24.

Figure 1A:
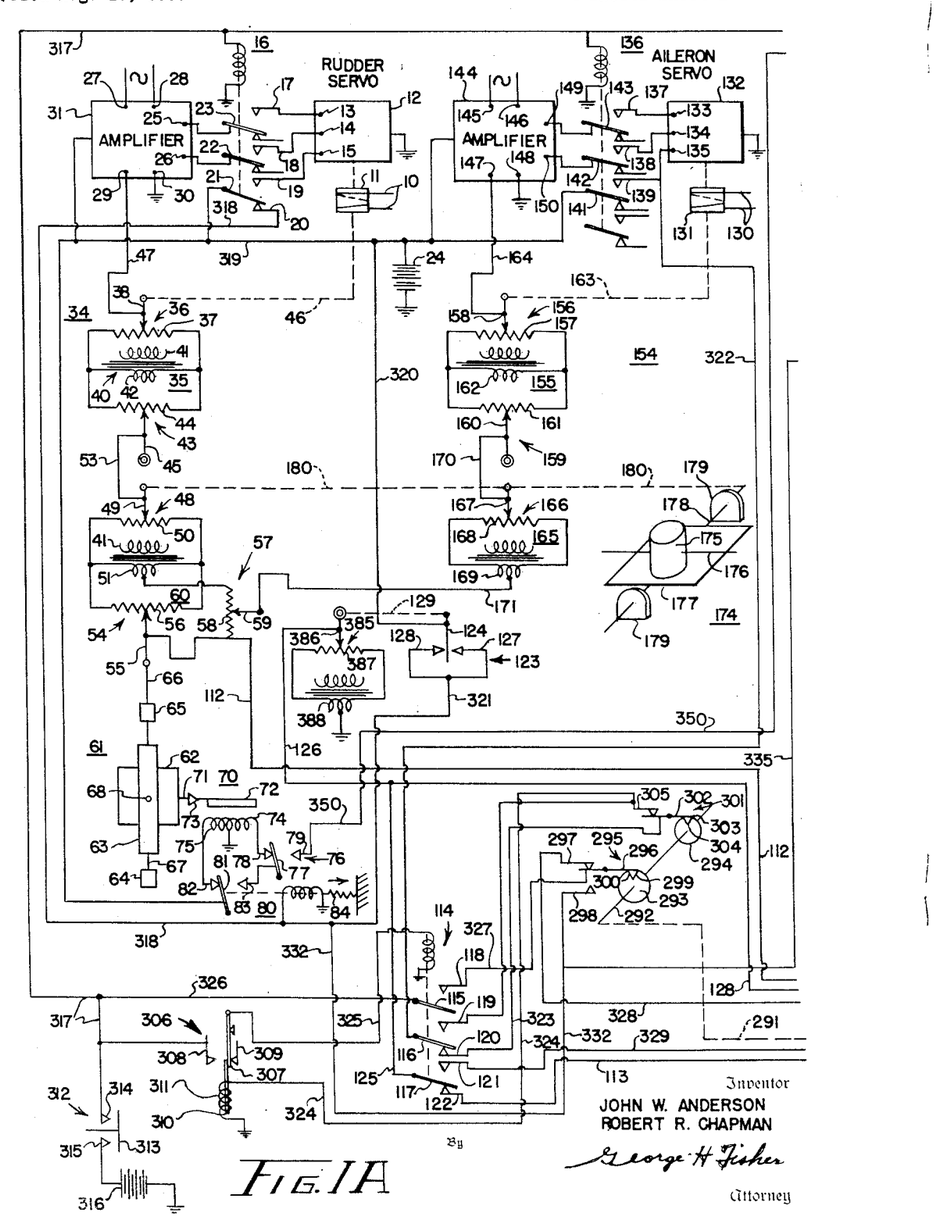

Control signals across input terminals 29 and 30 of amplifier 31 are obtained from a balanceable control network 34. Network 34 comprises a servo balance-centering network 35; a vertical gyro roll axis potentiometer 48; a directional gyro yaw network 60; and a pilot operated turn control potentiometer 385. Alternatively in place of the directional gyro network 60 signals may be obtained from a compass control network 85.

Network 35 comprises a servo balance potentiometer 36 having a resistor 37 and a slider 38; a transformer 40 having a primary winding 41 and a secondary winding 42; and a centering potentiometer 43 having a resistor 44 and a slider 45. Resistors 37 and 44 are connected in parallel across the ends of secondary winding 42. The slider 38 is operatively driven from the rudder servomotor 12 through a suitable operating connection 46. Slider 45 may be manually positioned. A lead wire 47 extends from amplifier terminal 29 to slider 38.

Potentiometer 48 includes a slider 49 and a resistor 50 which is connected across a secondary winding 51 of the main transformer. It is convenient to utilize a single primary winding for energizing a plurality of secondary windings and this arrangement has been adopted herein, therefore the same primary winding is indicated. Slider 49 is positioned in accordance with the deviations of the aircraft about its roll axis from a selected attitude by means to be described. A lead wire 53 extends from slider 45 of potentiometer 43 to slider 49.

Network 60 includes a directional gyro potentiometer 54 having a slider 55 and a resistor 56 and a potentiometer 57 having a resistor 58 and an adjustable tap 59. Resistor 56 is connected across the ends of primary winding 51 in parallel with resistor 50 of potentiometer 48. Resistor 58 of potentiometer 57 has one end connected to a center tap of secondary winding 51 and its opposite end connected to slider 55. Tap 59 is manually adjustable. Slider 55 is positioned with respect to resistor 56 in accordance with the change in heading of the aircraft with respect to a selected heading during stabilization. Slider 55 is positioned by directional gyroscope 61.

The directional gyroscope 61 is of the conventional type having three degrees of angular freedom. The rotor of the gyroscope (not shown) is supported upon a horizontal axis within casing 62 and is provided with suitable driving means. The casing 62 is supported on an axis 68 in an outer gimbal ring 63 which axis is at right angles to the spin axis of the rotor. The outer gimbal ring 63 has trunnions 66 and 67 supported in bearings 65 and 64. The upper trunnion 66 positions slider 55 of potentiometer 54 with respect to resistor 56 upon change in heading of the aircraft during stabilization.

At times it is desirable to center and lock the slider 55 in its mid position on resistor 56 and for this purpose the gyroscope 61 is provided with a caging mechanism 70. The caging mechanism 70 comprises a lug 71 centrally disposed on the exterior of casing 62 in line with the spin axis of the rotor. Lug 71 coacts with a hollow conical shaped member 73 mounted on a longitudinally slidable bar 72. Bar 72 is operated in one direction so that the conical shaped member 73 is engaged with the lug 71 to center and cage the gyro casing 62 and is moved in an opposite direction to be released therefrom. The bar 72 is operated by an uncaging winding 74 and a caging winding 75. Associated with the caging and uncaging windings 75 and 74 is a single pole double throw manually operable switch 76 having switch arm 77 and spaced contacts 78 and 79; and a caging relay 80 of a single pole double throw type. The caging relay includes an arm 81 which coacts with a caging contact 82 and an uncaging contact 83. The relay arm 81 is biased to engage the uncaged contact 83 by biasing means 84.

Returning to the remaining portion of control network 34 the turn control potentiometer 385 includes a manually operable slider 386 and a resistor 387 which is connected across the ends of a secondary winding 388 of the main transformer. The secondary winding 388 has a grounded center tap which is common with the grounded terminal 30 of amplifier 31.

Figure 1B:
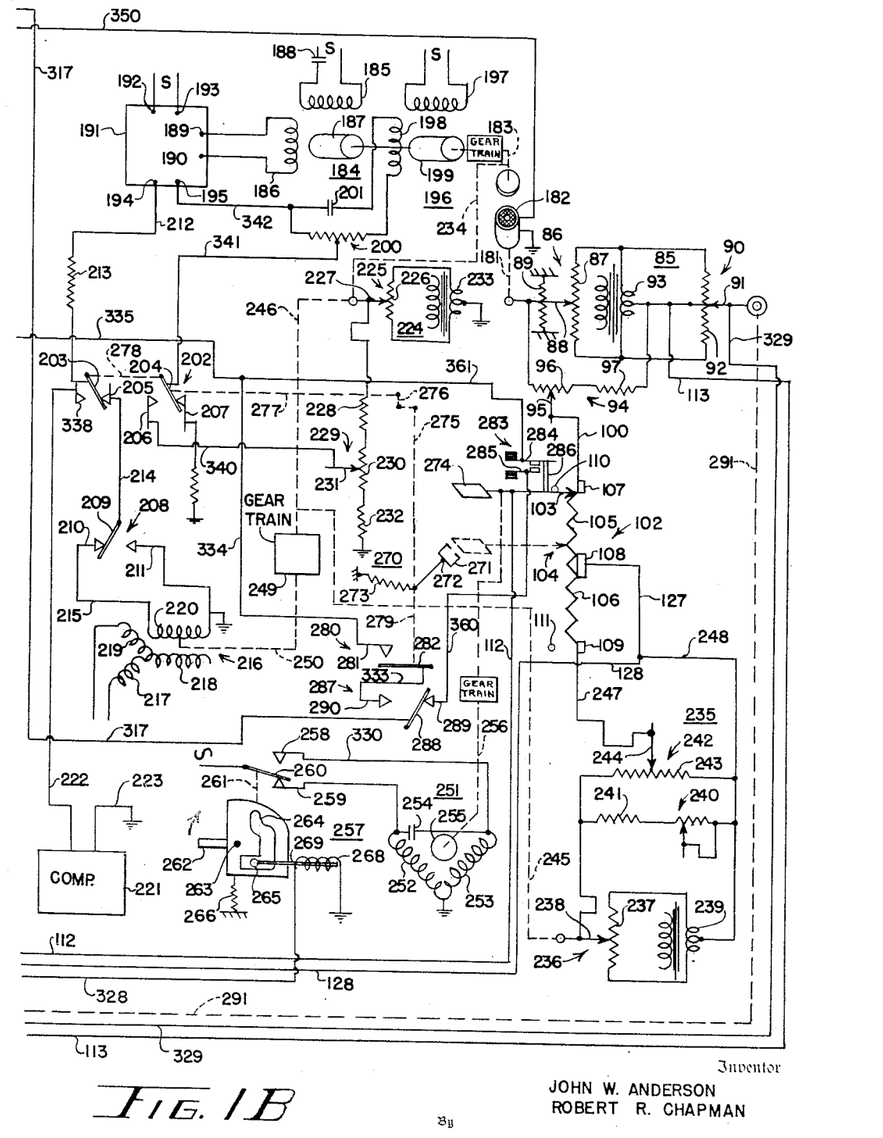

An alternative to stabilization by directional gyro control from network 60 is provided by the variable impedance network 85 which also has a remote manually selective turn control. Network 85 comprises a compass output potentiometer 86, a bombardier's potentiometer 90, a secondary winding 93 of the main transformer, a compass maximum bank angle control potentiometer 94, and a fixed resistor 97. Potentiometer 86 includes a resistor 87 connected across the ends of secondary winding 93 and a slider 88 biased to a central position by spring means 89. Potentiometer 90 includes a manually adjustable slider 91 and a resistor 92 which is connected across the end of secondary winding 93 in parallel with resistor 87. Secondary winding 93 has a center tap which is connected to a center tap of resistor 92. Potentiometer 94 comprises a manually adjustable tap 95 and a resistor 96 having one end connected to slider 88 and its other end connected in series with resistor 97 to the center tap of secondary winding 93.

Associated with the pilot's turn control potentiometer 86 is a fader potentiometer 102. Potentiometer 102 comprises a motor driven slider 103 and a resistor 104. The resistor is divided into a manual portion 105 and a computer portion 106. The resistor includes end taps 107, 109 and a broad center tap 108. The motion of slider 103 is limited by end stops 110 and 111.

When compass control is to be utilized, the slider 55 of the directional gyro potentiometer is placed at its center position and turn signals from the compass potentiometer 86 are introduced between the slider 55 and slider 386 of the pilot's turn control potentiometer.

For this purpose, a lead 100 extends from adjustable tap 95 of potentiometer 94 to end tap 107 of resistor 104. A lead 112 extends from the fader potentiometer slider 103 now engaged with tap 107 to slider 55 of potentiometer 54. A lead wire 113 extends from the center tap of secondary winding 93, an out contact 122 of a relay 114 to be described and the coacting relay arm 117, lead 125, lead 126, to slider 386 of the pilot's turn control potentiometer 385. The center tap 108 of fader potentiometer resistor 104 is connected by lead wire 127, lead wire 128 to wire 125 connected to the center tap of winding 93 and it is thus apparent that as slider 103 of potentiometer 102 moves toward the center tap a decreased proportion of the signal from potentiometer 86 is supplied to the network 34 for controlling amplifier 31.

When directional gyro control is to be applied to potentiometer 54, the compass potentiometer 86 will be unoperated and slider 88 will be in the center of its resistor 87. It will be now apparent that the rudder amplifier 31 is provided with a control circuit 34 which alternatively may include the directional gyro operated potentiometer 54 or the compass operated potentiometer 86.

The ailerons (not shown) are positioned from cables 130 extending from a cable drum 131 which is driven by an aileron servomotor 132. The aileron servomotor 132 is similar to the rudder servomotor 12 and includes a forward rotation clutch winding terminal 133, a reverse rotation clutch winding terminal 134, and a brake winding terminal 135. An aileron engage relay 136 which is of the four pole double throw type has three in contacts 137, 138, and 139 connected with the terminal of the servomotor 132. Associated with the relay contacts 137, 138, 139 are relay arms 143, 142, and 141 respectively. An aileron amplifier 144 controls the direction of rotation of the servomotor 132 through the engage relay 136. The amplifier 144 includes alternating current input terminals 145, 146, alternating current signal terminals 147, 148, and amplifier relay terminals 149, 150. Relay arm 141 is directly connected to battery 24 and terminals 149 and 150 of amplifier 144 are connected to battery 24 through operated amplifier relays as disclosed in the aforesaid patent to Hamby.

The control signal across terminals 147, 148 of aileron amplifier 144 is obtained from a network 154 which includes a servo balance-centering variable impedance network 155, a vertical gyro roll axis network 165, alternatively potentiometer 57 associated with the directional gyroscope network 69 or compass control network 85, and pilot's turn control potentiometer 385.

The servo balance-centering network 155 comprises a rebalance potentiometer 156, a centering potentiometer 159, and a secondary winding 162 of the main transformer. Potentiometer 156 includes a slider 158 operatively driven from the aileron servomotor 132 through a suitable operating means 163 and a resistor 157 which is connected across the ends of secondary winding 162. Potentiometer 159 includes a manually adjustable slider 160 and a resistor 161 which is connected in parallel with resistor 157 across the secondary winding 162. A lead wire 164 extends from amplifier terminal 147 to slider 158.

The vertical gyro roll potentiometer 165 comprises a gyroscope potentiometer 166 and a secondary winding 169 of the main transformer. Potentiometer 166 includes a slider 167 and a resistor 168 which is connected across the ends of secondary winding 169. Slider 167 is positioned with respect to resistor 168 in accordance with the movements of the aircraft about the roll axis from a selective attitude. A lead wire 170 extends from slider 160 to slider 167. Network 69 and potentiometer 85 have been described with reference to the rudder amplifier input circuit. A lead wire 171 extends from a center tap of secondary winding 169 to adjustable tap 59 of potentiometer 57.

The means whereby sliders 167 and 49 in networks 154 and 34 respectively are positioned in accordance with the movement of the craft about the roll axis comprises a vertical gyroscope 174. The vertical gyroscope may be of any conventional type having a rotor (not shown) mounted for rotation about a vertical spin axis within a casing 175. The rotor casing 175 is journalled for rotation about a horizontal axis 176 in an outer gimbal ring 177. The outer gimbal ring 177 in turn is supported for rotation about a horizontal axis 178 at right angles to axis 176 by pedestal bearings 179, 179. The gyroscope 174 is so arranged in the craft that upon movement of the craft about the roll axis from a selected attitude there will be a relative movement between gimbal 177 and pedestal bearings 179 about axis 178 which is communicated by suitable operating means 180 to sliders 167 and 49.

For operating the compass potentiometer 86, there is provided an operable driving connection 181 for slider 88 which through magnetic clutch 182 is coupled to the drive shaft or output shaft 183 of a control motor 184. The control motor 184 is of the capacitor-inductance type having a line winding 185, an amplifier winding 186, and a rotor 187. The line winding 185 is connected to the alternating current source through a phasing condenser 188. The amplifier winding 186 is connected to output terminals 189, 190 of an amplifier 191.

The amplifier 191 is of the discriminator type and is provided with power input terminals 192, 193, and signal input terminals 194, 195. The amplifier-motor combination is well known and is such that current in the amplifier winding 186 will either lead or lag the current in line winding 185 depending upon the phase relationship between the signal voltage across terminals 194 and 195 with respect to the voltage across power input terminals 192, 193. Such phase relationship hence determines the direction in which motor 184 is operated.

The motor 184 drives a "velocity generator" 196 of known type having a primary winding 197 connected to the source of alternating current and a secondary winding 198 inductively associated with primary winding 197 through rotor 199. The voltage induced in secondary winding 198 is dependent in phase and magnitude upon the direction and speed of rotation of rotor 199. Across the secondary winding 198 there is connected in series a voltage dividing resistor 200 and a capacitor 201.

The input circuit connected to signal input terminals 194 and 195 of amplifier 191 is controlled by a double pole, double throw switch 202 and a manually operable single pole, double throw switch 208. Switch 202 includes switch arms 203 and 204. Switch arm 203 coacts with a computer contact 338 and a compass contact 205. Switch arm 204 coacts with a rebalancing network contact 206 and a ground contact 207. Switch 208 includes a switch arm 209 which coacts with a compass contact 210 and a compass bypass contact 211.

Compass controlled signals are provided by a control transformer 216. Control transformer 216 comprises a stator having three phase windings 217, 218, 219 and a rotor winding 220. The control transformer may be controlled through a coupling device directly by a magnetic compass such as a flux valve compass or by a directional gyroscope slaved to a magnetic compass. The magnetic compass control may be provided by a flux valve compass as disclosed in the patent to Stuart, Jr., 2,439,701. For example, the stator windings 28, 29 and 30 of the patent to Stuart conform to the windings 217, 218, and 219 herein and the rotor winding 33 corresponds with the rotor winding 220 herein. When a slaved directional gyroscope as in Patent 2,484,862 to Streeter, Jr., is utilized a synchro transmitter controlled by the directional gyroscope has a three phase stator winding which is connected to the corresponding windings of the control transformer herein.

As has been inferred from a description of switch 202, it is also desirable to control the input circuit connected to terminals 194 and 195 of amplifier 191 from the computer 221. This computer is of known type which computes from various factors such as wind direction, airspeed, distance, etc., the course to be flown. It may be such as will provide an alternating output course control signal to output leads 222, 223. The system may function with various other types of course control devices one of which is disclosed in an application of Alderson et al., Serial No. 49,442, filed September 15, 1948, where in Figure 7 conductors 495, 496 and 493, 494 are functionally substantially the same as conductors 222, 223 herein. Lead 222 is connected to computer contact 338 of switch 202 and lead 223 is connected to ground. The control circuit for the amplifier 191 during computer control in addition to the computer output includes a rebalance network 224.

The rebalance network 224 comprises a rebalance potentiometer 225 having a resistor 226 and and a slider 227; a fixed resistor 228; a potentiometer 229 having a resistor 230 and a manually adjustable tap 231; a fixed resistor 232; and a secondary winding 233 of a transformer. The resistor 226 is connected across the ends of secondary winding 233 and the slider 227 is operatively positioned by the output shaft 183 of the control motor 184 through a suitable operating connection 234. Resistor 228 has one end connected to the slider 227 and its opposite end connected to one end of resistor 230 of potentiometer 229. The opposite end of resistor 230 is connected in series with resistor 232 to ground. The secondary winding 233 has a grounded center tap.

During computer control of the amplifier 191, the input circuit across terminals 194 and 195 of the amplifier comprises the computer 221, the velocity generator energized voltage divider 200, and the rebalancing network 224.

During computer control of the amplifier 191, there is provided a network 235 which transmits into the autopilot system signals proportional to the movements of motor 184 which have been controlled by the computer. The impedance network 235 comprises a computer output potentiometer 236 having a resistor 237 and a slider 238; a secondary winding 239 of the transformer; a variable resistor 240; a fixed resistor 241; and a potentiometer 242 having a resistor 243 and a slider 244. Resistor 237 is connected across the ends of secondary winding 239. Resistor 243 of potentiometer 242 is connected across slider 238 and a center tap of secondary winding 239. One end of resistor 241 is connected to an end of variable resistor 240 and their remaining ends are connected across the slider 238 and the center tap of secondary winding 239. Slider 238 is operatively driven from output shaft 183 of the control motor through the operating means 234, 246, and 245. The slider 244 of potentiometer 242 is connected by a lead 247 to end tap 109 of the fader potentiometer resistor. The center tap of secondary winding 239 is connected by leads 248, 127 to the center tap 108 of the fader potentiometer resistor 104.

It will thus be apparent that with the fader potentiometer slider 103 at the lowermost position which it may assume in the figure, the output voltage of network 235 which exists between tap 244 of potentiometer 242 and the center tap of secondary winding 239 forms part of impedance network 34 by connecting tap 244 through lead 247, end tap 109, slider 103, lead 112, to slider 55 of potentiometer 54 and connecting the center tap of secondary winding 239 through lead 248, lead 128, to slider 386 of the turn control potentiometer 385.

The fader potentiometer slider 103 is positioned from a fader motor 251 through an operating connection 256, a portion of its travel being represented in dotted lines. The fader motor may be a capacitor type induction motor having field windings 252, 253 across which is connected a phasing capacitor 254 and a rotor 255 inductively associated with the field windings.

The fader motor 251 is controlled by a manually operable bombardier's selector switch 257. Selector switch 257 includes a single pole double throw switch having a computer contact 258 and a manual contact 259 which are engaged by a switch arm 260. Switch arm 260 is operated from a rockable member 262 through an operating connection 261. The member 262 is pivoted at 263 and has biasing means 266 for returning it to the position shown. The member 262 is provided with a suitable cutout or slotted portion 264 which is engaged by a laterally offset portion 265 of a solenoid plunger 269. The plunger 269 is operated by a winding 268. The configuration of the slotted portion 264 is such that it together with the lateral extending portions 265 constitutes locking means for the member 262. The member 262 is thus solenoid controlled, the action being such that the member 262 cannot be moved from its manual position shown until winding 268 is energized. With winding 268 energized, it will be possible to move the member 262 in a clockwise direction whereby the connecting member 261 is cammed upwardly to move switch arm 260 to engage contact 258. When member 262 is thus operated, the operated plunger 269 engages the upper end of portion 264 which together serve as a holding mechanism for the member 262 to maintain the member in the operated position. If winding 268 be deenergized while plunger 269 is maintaining the member 262 in the operated position, return means 266 returns the member 262 to the manual position shown. If necessary it is also possible to manually override the holding action of yieldable plunger 269 to return the member to its manual position.

Operatively related with the slider 103 of the fader potentiometer 102 is a switch operating mechanism 270 for the compass-computer selector switch 202. The mechanism for example may comprise a forked member 271 pivoted intermediate its ends at point 272. The single end of the forked member is engaged by an over center spring 273 operating in compression. The forked ends of the member 271 form arms which are engaged by the member 274 of slider 103. The arrangement is such that when the slider moves in one direction it operatively engages one arm of the fork member and when it moves in the opposite direction on return it engages the other arm of the fork member. Movements of the single end of the fork member are communicated by link 275, bell crank 276, and link 277 to arm 204 of switch 202. The arm 204 is operatively linked for joint operation with arm 203 through operating means 278.

Also associated with the operating mechanism 270 is a fader potentiometer slider operated gyro caging switch 280 of the single pole single throw type having a contact 281 and an arm 282 engageable therewith. The arm 282 is operated from the forked member 271 by operating means 279.

Also associated with the slider 103 of the fader potentiometer 102 is a magnetic clutch circuit control switch 283. This switch comprises two spring arms 284, 285 having contacts which are biased into engagement. An operating member 286 on slider 103 engages an extension of arm 284 to separate the contacts of switch 283 when slider 103 is in its uppermost position.

The relationship between the fader potentiometer resistor 104 and the switch operating means for switches 202, 280, and 283 is briefly set forth here. It is desired to operate the slider 103 so that it requires approximately 8 seconds for the slider to move from stop 110 to stop 111. The center dead spot 108 is of such width as to correspond to one second of travel of the slider. The movements of slider 103 will effect operation of the switch 202 during the first quarter of second as the slider moves from the upper end of the dead spot 108 downwardly in the figure. The switch 280 is closed when the slider 103 enters the dead spot from the upper or manual end shown. The switch 283 is opened when the slider 103 enters the dead spot 107 from the lower toward the upper end as shown on the figure, and prior to the time that it engages the stop 110.

Switches 280 and 283 are not used simultaneously or in a common system but are alternatively selected by a manually operable selector switch 287. Switch 287 is of the single pole double throw type having a switch arm 288 which may engage with one or the other of switch contacts 289, 290.

The arrangement for controlling the unlocking of the bombardier operable member 262 of selector 257 will now be considered. The slider 91 of potentiometer 90, in network 85, which comprises the bombardier's turn control signal means has its operating knob connected to its driven means 291. This driven means 291 serves as the operating means for a shaft 292. On this shaft 292 are notched discs 293 and 294. Operatively related with the notched disc 293 is a directional gyro caging-solenoid lock releasing switch 295. This switch comprises a switch arm 296 pivoted intermediate its ends with one end having a follower engaged with a notch 299 of disc 293 when the disc is in its normal position. The arm 296 has its free end coacting with a locking solenoid release contact 297 and a directional gyro caging contact 298. It will be apparent from the figure that as disc 293 rotates, a follower 300 rides out of the notched portion 299 and engages the periphery of the disc 293 to disengage switch arm 296 from contact 297 and to engage it with contact 298.

The notched disc 294 coacts with a single pole single throw normally closed switch 301. Switch 301 is denoted the pilot's transfer switch locking solenoid control switch and comprises an arm 302 pivoted intermediate its ends and having a follower 303 engaged in a notch 304 of disc 294. The free end of switch arm 302 engages in normal position a contact 305.

A pilot operated transfer switch 306 serves to transfer control from the pilot to the remote station such as the bombardier station. Switch 306 is of the single pole double throw type having an operating arm 307 which may engage with a transfer relay contact 308 and an idle contact 309. Switch arm 307 may be held in its unoperated position when the switch arm engages contact 309 by a solenoid operated plunger 310. Upon energization of the winding 311 the plunger is moved to release the switch arm 307 whereby it may be manually moved to engage contact 308.

A manually operable master switch 312 is provided. Switch 312 is of the single throw double make type having a bridge member 313 which engages simultaneously contacts 314 and 315. The switch is normally in open position and when closed serves to couple a battery 316 to a main D. C. bus bar 317.

*Operation*

The operation of the control system will be considered with a configuration wherein the directional control is provided in one case by a directional gyroscope or by a computer and in a second case where the directional controller is provided by a synchro transformer controlled by a magnetic compass or slaved gyroscope with alternative control being provided by a computer. The directional gyroscope-computer configuration will be considered first.

During control from a directional gyroscope, switch arm 77 of manual control switch 76 engages contact 78, switch arm 209 of manually operable switch 208 engages contact 211, and switch arm 288 of manually operable switch 287 engages contact 290.

With the craft airborne and with the control surfaces being manually operated, the directional gyroscope 61 is in a caged condition. This caging is effected by a circuit extending from battery 24, arm 21 of rudder engage relay 16, out contact 20, lead wire 318, caging relay 80, to ground, and to battery ground return. With relay 80 operated, a circuit is now completed from battery 24, lead 319, caging relay arm 81, in contact 82, caging winding 75 of caging mechanism 70, to ground, to battery ground. The directional gyroscope 61 is thus held in its center position during manual flight. With the craft in level position and headed in the desired direction, the pilot may operate switch 312 completing a circuit from battery 316, switch 312, D. C. bus 317, a parallel path comprising rudder engage relay 16, to ground, and aileron engage relay 136 to ground, and return to battery. The aileron and rudder servomotors are now engaged with their respective control surfaces. The directional gyroscope is now uncaged since the circuit to caging relay 80 is broken between switch arm 21 and out-contact 20 of the rudder engage relay permitting spring 84 to move arm 81 into abutment with contact 83 to energize uncage winding 74.

With the autopilot so engaged, any deviation of the craft from the desired heading will be corrected by the directional gyroscope 61, and its potentiometer 54 which supplies control signals for the rudder and aileron and any change in attitude of the craft about the roll axis will be corrected by vertical gyro 174 through the potentiometers 166 and 48 in networks 154 and 34 which supply bank correction and rudder compensation signals.

When the pilot desires to change the heading of the aircraft, he operates the pilot's turn control potentiometer 385 and moves simultaneously through the operating connection 129 the arm 124 of switch 123 into engagement with contact 127 or 128. The caging relay 80 is thereby energized by a circuit extending from battery 24, lead wire 320, switch arm 124, contacts 127 or 128, lead wire 321, caging relay 80, to ground, and to ground of battery 24. When the craft has changed heading the desired amount, the turn control potentiometer is returned to its normal position at which time the arm 124 disengages its engaged contact and the caging relay moves to its unoperated position with arm 81 engaging contact 83 completing a circuit from battery 24, lead 319, switch arm 81, out contact 83, switch arm 77, contact 78, to the uncaged winding 74 of caging mechanism 70, to ground, and to the ground of battery 24.

The pilot may transfer control of the automatic control system to the bombardier who is at a station remote from the pilot's position. For this purpose the pilot operates the transfer switch 306 so that arm 307 engages contact 308. Before the pilot may operate the switch arm 307 the bombardier's turn control potentiometer 90 must be in normal position so that the follower 303 which coacts with the disc 294 engages the notch 304 of said disc. This setting of notched disc 294 completes a circuit from battery 24, arm 141 of the aileron engage relay 136, in contact 139, lead 322, arm 116 of relay 114, out contact 120, lead 323, switch arm 302, contact 305, lead 324, winding 311 of the locking relay, to ground, and to the ground of battery 24.

With the transfer switch arm 307 to the left a circuit is completed from battery 316, switch 312, contacts 308, switch arm 307, lead 325, to relay 114, to ground, and to the ground of battery 316.

With the operation of transfer relay 114, the locking means 269 of the bombardier selector 257 is moved to releasing position and this is effected by a circuit extending from battery 316, switch 312, D. C. bus 317, lead 326, relay arm 115, in contact 118, lead 327, switch arm 296, contact 297, lead 328, solenoid operating coil 268, to ground, and to the return of battery 316.

Figure 2:
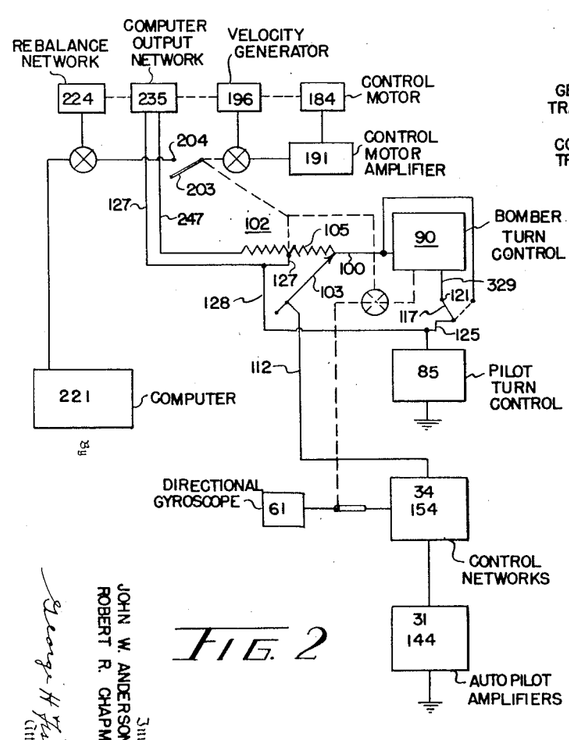
Figures 2 and 3 are flow diagrams for two configurations.

With the transfer relay 114 energized, which thereby maintains a holding circuit for coil 311, the bombardier may determine whether he shall provide bombardier's manual turn control or control from the computer. Reference is now made to Figure 2 which is a simplified flow diagram of the arrangement using a directional gyroscope in combination with a computer. With the member 262 in its position shown in Figure 1B, the pilot may operate the bombardier's turn control potentiometer 90 to manually make changes in the heading of the craft. The output of the bombardier's turn control potentiometer 90 is applied across portion 105 of the fader potentiometer resistor which with the fader potentiometer slider 103 forms a voltage divider for the output of the bombardier's turn control potentiometer. This is obtained by connecting lead 100 representing one side of the output of potentiometer 90 to one end of resistor 105 and connecting the other end of resistor portion 105 by means of lead 127, lead 128, lead 125, relay arm 117, in contact 121, to lead 329, connected to slider 91 of potentiometer 90.

If the bombardier desires to introduce computer control he may move the control member 262 clockwise to engage switch arm 260 with contact 258. The fader motor 251 for driving slider 103 is now energized, a circuit being completed from an alternating current source, switch arm 260, operated contact 258, lead 330, through fader motor windings 253 and 252, to ground, and to the ground of the supply. The fader motor slider now begins to move in the downward direction in Figure 1B or counterclockwise in Figure 2. As slider 103 enters center deadspot 108, switch 280 is closed thus completing a circuit from battery 316, lead 317, arm 288, contact 290, lead 333, switch 280, leads 334, 335, 332 for energizing the caging relay 80 and thus caging the directional gyroscope.

As the slider 103 of the fader potentiometer enters the center dead spot 108 as stated, switch arm 203 is operated also and is brought into engagement with computer contact 338 while the switch arm 282 of caging switch 280 is operated as mentioned to engage contact 281. The movement of slider 103 of the fader potentiometer to its mid position has been indicated in Figure 2 as resulting in the directional gyroscope 61 being made ineffective with respect to the control networks 34 and 154.

With the operation of switch 292 at the time arm 203 engages contact 338 as stated, the input circuit across terminals 194 and 195 of amplifier 191 extends from terminal 194, lead 212, resistor 213, switch arm 203, contact 338, computer lead 222, ground lead 223, grounded resistor 232, voltage divider 229, lead 340, contact 206, switch arm 204, lead 341, voltage divider resistor 260, lead 342, and amplifier terminal 195. A signal from computer 221 initiates operation of the amplifier 191 which causes the operation of the control motor 184. The control motor through its output shaft 183 and driving connection 234 operates slider 227 of the rebalance potentiometer 225 and simultaneously through the operating connections 246, 245, drives the slider 238 of the computer output potentiometer 236. The motor 184 drives the slider 227 until the net output of network 224 which includes potentiometer 225 corresponds with the computer input, the velocity generator 196 meanwhile provides an antihunt control for motor 184.

As the fader motor slider 103 moves toward its lower end in Figure 1B from center tap 108, it is apparent that it introduces into the autopilot control networks signals from the network 235 which includes computer output potentiometer 236 in a gradually increasing manner since the portion 106 of the fader potentiometer resistor 104 along with slider 103 constitutes a voltage divider across the network 235. The control signal as determined from the computer 221 is thus gradually applied from network 235 to networks 34, 154 until the full value of the full output of network 235 is applied to the networks 34 and 154.

When the bombardier desires to return to his manual control, the control member 262 is moved counterclockwise in Figure 1B to its position illustrated, and the fader motor 251 is energized in the opposite direction to move the slider 103 toward its upper position as shown in Figure 1B or clockwise as shown in Figure 2. The switches 202, 203, and 280 are operated as the slider goes through the center dead spot 108 of potentiometer resistor 104. With the switch arm 203 engaged with contact 205, the computer 221 is no longer connected to amplifier 191. Any residual signal in computer output network 235 due to displacement of slider 238 will be of no effect once the slider 103 of the potentiometer reaches the dead spot 108 in its progress from the lower to the upper end as shown in Figure 1B.

If computer control is reintroduced with a residual signal in network 235, the width of the dead spot 108 at the center of resistor 104 is of sufficient length to permit the computer 221 to effect positioning of the slider 238 in proportion to the computer input before the slider 103 leaves the center dead spot and moves toward the lower end of the fader potentiometer resistor as shown in Figure 1B. The control motor 184 operates slider 227 of the rebalance potentiometer 225 at a speed such that it requires but 1/3 of a second for the slider to be operated from one extreme position to the other so that ample time is provided for effecting the positioning of the computer output potentiometer slider 238 in accordance with the computer input value.

Figure 3:
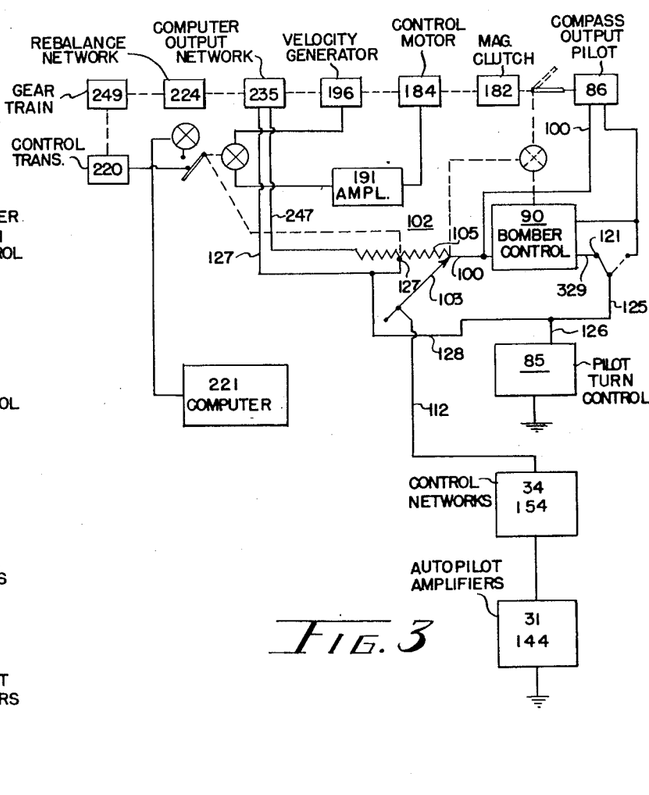

We may now consider the second configuration wherein directional control is supervised by the control transformer operated by a flux valve compass instead of the directional gyroscope which compass may be thus placed in combination with the computer 221. The flow diagram for this arrangement is illustrated in Figure 3. As a preliminary, switch arm 77 of switch 76 is manually engaged with contact 79, switch arm 209 of switch 208 is engaged with contact 210, and switch arm 288 is placed in engagement with contact 289. With the fader potentiometer slider 103 in its upward position in Figure 1B or in its right position as shown in Figure 3, the circuit extending from battery 24, lead 319, caging relay arm 81, contact 83, switch arm 77, contact 79, lead 350, magnetic clutch 182, to ground and to return of battery 24, energizes the magnetic clutch to couple the output shaft 183 of the control motor 184 to slider 88 of the compass output potentiometer 86.

Any deviation of the craft from the desired heading results in a signal being applied from the magnetic compass transmitter to the rotor 220 of the control transformer 216. One end of control transformer rotor 220 is coupled by lead 215, contact 210, switch arm 209, lead 214, contact 205, switch arm 203, resistor 213, lead 212, to amplifier terminal 194. Amplifier terminal 195 is connected by lead 342, velocity generator voltage divider 200, lead 341, switch arm 204, contact 207, to ground, and to the opposite or grounded side of rotor 220. The amplifier 191 operates under the signal in rotor 220 and effects rotation of control motor 184 to position the rotor 220 to a null position the operation being effected by output shaft 183, operating means 234, 246, gear train 249, and operating connection 250. At the same time, the control motor drives the slider 88 of the compass output potentiometer 86.

Signals from potentiometer 86 are applied across fader resistor portion 105 which with slider 103 forms a potential divider. With the slider 103 at the manual or upper end of the potentiometer resistor as shown in Figure 1B the full voltage from potentiometer 86 modified by tap 95 is applied between lead 112 leading to control networks 34 and 154 and lead 126 connected to ground through the pilot turn control potentiometer 85. As the craft moves toward the magnetic heading being maintained, an opposite signal is induced in rotor 220 of control transformer 216 energizing amplifier 191 and causing the reverse movement of control motor 184. Slider 88 of potentiometer 86 as well as the control transformer rotor 220 are moved back to their normal position with respect to their resistors and three phase windings respectively.

If the bombardier wishes to execute a manual control turn, he operates the bombardier potentiometer 90. This operation also rotates notched disc 293 so that switch arm 296 engages contact 298 thereby completing a circuit from bus 317, lead 326, switch arm 115, contact 118, lead 327, switch arm 296, contact 298, lead 332, to the caging relay 80. Relay 80 operates and moves relay arm 81 out of engagement with contact 83 thereby breaking the circuit for the magnetic clutch 182 between relay arm 81 and contact 83. With the magnetic clutch deenergized, the drive between output shaft 183 and slider 88 is disengaged and spring means 89 restore the slider 88 to its normal position. Were the fader slider 103 in its manual position as shown in Figure 3, the full signal from the bombardier's potentiometer 90 is applied between lead 126 and lead 112 to effect operation of the autopilot amplifiers and the consequent operation of the control surfaces to change the heading of the aircraft.

Such manual changes in heading of aircraft which result in a signal being set up in control transformer rotor 220 cause it to operate the amplifier 191 and the control motor 184 which operates the rotor 220 to maintain it in a null position during bombardier's changes in heading.

If the bombardier desires to obtain computer control, the selector member 262 is moved toward the upward position or clockwise in Figure 1B thereby energizing the fader motor 251. The motor 251 drives the slider 103 toward the downward position from end tap 107 in Figure 1B or leftward in Figure 3.

As soon as slider 103 leaves the manual end, switch 283 is permitted to close completing a circuit from D. C. bus 317, switch arm 288, contact 289, lead 360, switch 283, lead 361, lead 335, lead 332, to the caging relay 80. Upon operation of caging relay 80 the circuit for the magnetic clutch 182 is broken between relay arm 81 and contact 83. The spring means 89 of potentiometer 86 center the slider 88 upon opening of the magnetic clutch 182. As the slider 103 passes through the center dead spot 108 of resistor 104, it operates the switch 202 to engage switch arms 203 and 204 with contacts 338 and 206.

The control circuit of amplifier 191 now includes the computer 221, the output of velocity generator 196, and the rebalancing network 224. The computer 221 will control the amplifier 191 and the control motor 184 to effect operation of the slider 227 of the rebalance potentiometer 228 in proportion to the input signal from the computer. This operation of slider 227 is accompanied by displacement of slider 238 in the computer output network 235. The network 235 will therefore control the autopilot networks 34 and 154 and the autopilot amplifiers 31 and 144. The effect of network 235 is gradually introduced as the fader potentiometer slider 103 moves from the center dead spot 108 toward the lower end tap 109 in Figure 1B.

As the aircraft approaches computer called for heading, the signal from the computer 221 decreases and the signal from the rebalance network 224 predominates, effecting reverse rotation of the control motor 184 so that when the computer output is zero the slider 227 of the rebalance network 224 and the slider 238 of the compass output network 235 are again at their normal positions.

The control motor 184 has also driven through the gear train 249 having a 6 to 1 speed reduction the rotor 220 of the control transformer 216. This forward and reverse rotation of the control motor 184 has not resulted ultimately in any change in position of the rotor 220 with respect to the three phase windings 217, 218, and 219. It is apparent therefore that this change in heading as determined by the computer will leave a residual signal in rotor 220 of control transformer 216. If it be desired to return the fader slider 103 to the manual end, the bombardier operates the control member 262 to its downward position shown in Figure 1B. As slider 103 passes upwardly through the center dead spot 108 it again moves the switch 202 causing switch arms 203 and 204 to engage contacts 205 and 207. With the aforementioned residual signal in rotor 220, it would appear upon operation of switch 202 that the amplifier 191 would effect operation of slider 88 through the control motor 184. However, the magnetic clutch 182 remains deenergized until slider 103 is at the extreme manual end of the resistor 104 at which time the switch 283 is opened.

The arrangement is such that the rotor 220 of the control transformer will be placed in a null position before the switch 283 is opened by slider 103 as will be apparent from the following discussion. It was stated that approximately 8 seconds is required for fader slider 103 to move from stop to stop on the fader potentiometer resistor. The speed of the output shaft 183 is about 60 R. P. M. and the speed of the output shaft 250 from gear train 249 is about 10 R. P. M. This corresponds with one revolution per second and ⅙ of a revolution per second respectively for these shafts. With the center tap 108 of resistor 104 equal to a one second interval and an eight second period for the entire travel of slider 103, it is evident that there are 7 half seconds remaining between the time slider 103 leaves the dead spot 108 and until it reaches stop 110 in Figure 1B. While the rotor 220 of transformer 216 can be driven at a speed of one sixth revolution per second and there is available three and one half seconds between the time the signal from rotor 220 is applied to amplifier 191 and the time of closing of the clutch 182 and since the greatest angular deviation rotor 220 can have with respect to its stator windings is 180 degrees or 3 seconds time of travel, it is apparent that rotor 220 will be placed in a null position with respect to its stator before the slider 103 opens the switch 283 at the end of its travel. Thus any residual signal remaining in control transformer 220 due to change in heading of the aircraft under computer control will merely result in operation of motor 184 to place the rotor in a null condition before compass control is applied to the compass output potentiometer 86.

Figure 4:
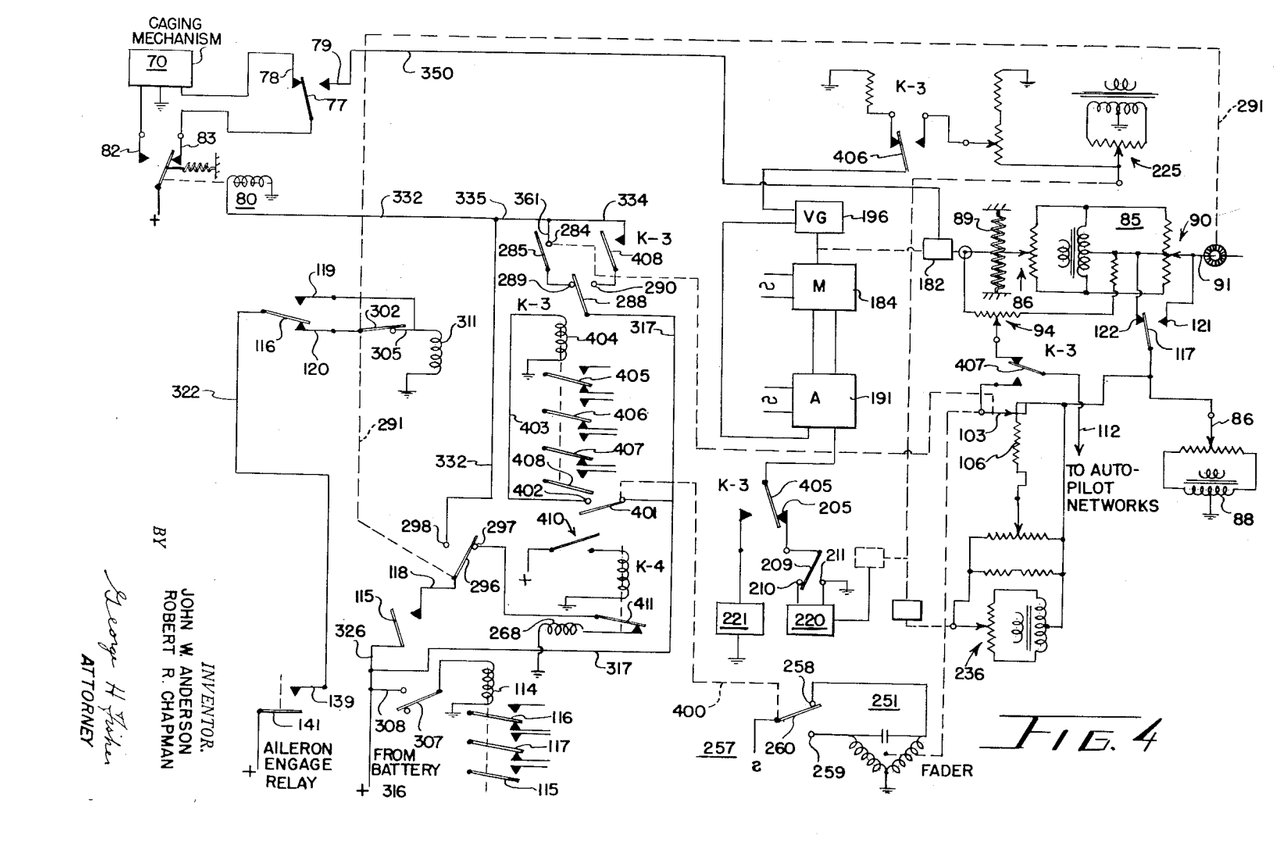
Figure 4 is a modification of Figures 1A and 1B.

Figure 4 illustrates in schematic form a modification of a portion of the arrangement shown in Figures 1A and 1B. The substitution or modification in Figure 4 consists primarily in substituting relay operated switch arms for the motor operated switch arms 203, 204, and 282 of Figure 1B and additionally substituting a further pair of relay contacts associated with network 85 to replace the upper end 105 of the fader potentiometer 102. This results that upon a bombardier's selected change from compass control to computer control instead of fading out initially the compass signal as the fader potentiometer slider 103 moves from the manual end toward the center tap 108 in Figure 1B the control of the craft by the compass is immediately suspended and computer control of the craft begins to "fade in."

A further change in the circuit is the provision of a further relay which is energized upon the operation of a switch, either manually or by automatic means, to disassociate the control of the autopilot from computer and to introduce the compass control of the automatic pilot.

Referring to Figure 4, the elements of the overall arrangement which have their corresponding parts in the arrangement of Figures 1A and 1B are identified by the same reference characters. Thus, there is the selector switch 307 located at the pilot's position which when moved to the operated position will energize the relay 114. Structurally, the pilot's selector switch 307 and the bombardier's switch 260 are similar to the bombardier's switch 262 of Figure 1B. Thus, both the switch 307 and the switch 260, if in the operated position, drop into and lock in the unoperated position when the individual locking solenoid for each switch is not energized. When the respective solenoid for each switch is energized, the switch may be moved from unoperative to operative position and is automatically held in this operated position with permissible manual override. The individual solenoids for switches 307 and 260 correspond with the solenoid 268, 269 of Figure 1B.

It will be recalled that the bombardier's switch 260 is moved from its manual contact 258 to its automatic contact 259 when it is desired to introduce computer control of the automatic pilot. In the arrangement of Figures 1A and 1B the operation of switch 260 caused operation of the fader motor which in turn (in the arrangement of Figures 1A, 1B) operated during its movement the switch arms 203, 204, and 282. It has been found desirable to omit the motor operation of the switch arms and to operate manually a second switch arm 401 simultaneously with the switch arm 260 through an operating connection 400. The operation of arm 401 engages a contact 402 to energize an operating coil 404 of a K-3 relay which replaces the fader motor as a switch operator.

The K-3 relay has a switch arm 405 which coacts with an in and an out contact; a switch arm 406 which coacts with an in and an out contact; and a switch arm 407 which coacts with an in and an out contact; and a switch arm 408 which coacts with only an in contact. Relay switch arm 405 replaces motor operated switch arm 203 of Figure 1B whereby to change from compass or directional gyro heading control to computer heading control. The relay arm 406 replaces the motor operated switch arm 204 whereby the rebalance potentiometer 225 operated by control motor 184 may be included or omitted from the input circuit of amplifier 191. The relay operated switch arm 408 corresponds to the motor operated switch arm 282 and thus serves to deenergize the magnetic clutch 182 to thereby disassociate the compass potentiometer slider 88 from the drive shaft 183 from control motor 184.

Switch arm 407 of the K-3 relay functionwise replaces the upper end 105 of the fader potentiometer 102 and the conductors 128 and 329 associated therewith. This switch arm 407 and its associated contacts serve to connect the computer output potentiometer 236 to the autopilot input lead 112 and to simultaneously disconnect from the autopilot lead 112 the network 85 which includes the compass output potentiometer 86 and the bombardier's potentiometer 90.

The relay has been shown in its entirety with its operating coil 404 but the switch arms and their coacting contacts have been illustrated again in the circuit arrangement to bring out more clearly the function of each switch arm and its related contacts.

A K-4 relay is provided with a single switch arm 411 which coacts with an out contact. The solenoid of the K-4 relay is energized through a single pole single throw switch 410 which as stated may be manually or automatically operated for example from the bomb bay doors or similar apparatus on the aircraft.

The operation of the arrangement of Figure 4 will now be considered when the compass directional stabilization of the craft is utilized at which time the switch arm 288 is engaged with the right contact 299 and the switch arm 209 is engaged with the left contact 210 of the compass synchro so that the output of the compass synchro is applied to the control motor amplifier 191. We may assume that the aileron engage relay 136 and the rudder engage relay 16, Figure 1A, have been energized and in the aileron engage relay, the relay arm 141 engages its in contact 139.

Preparatory to the pilot's operating the switch arm 307, which as stated is of the solenoid controlled type, the bombardier's potentiometer 90 must have its slider 91 in center position so that switch arm 302 operated with the slider engages contact 305 to thus close a circuit to the solenoid coil 311 through an out contact 120 of relay 114. With solenoid 311 as thus energized, the switch 307 is released from its locking solenoid and the pilot may engage switch arm 307 with contact 308. This closes the circuit through the operating coil of relay 114 which operates the three relay arms 115, 116, and 117. Switch arm 116 maintains a holding circuit for relay coil 311; switch arm 115 supplies direct current to switch arm 296 operated by the bombardier; switch arm 117 engages contact 121 to permit bombardier's potentiometer 90 to control the course of the aircraft.

At this time the output of the synchro 220 controls the heading of the aircraft and changes in heading may be provided by the bombardier operated potentiometer 90.

In order to introduce computer control, the bombardier will move the switch arm 260, which is of the solenoid controlled type, from contact 258 to contact 259. Before switch arm 260 may be operated the slider 91 of the bombardier's potentiometer 90 must again be in center position at which time the switch arm 296 operated along with the slider 91 is in engagement with contact 297 to complete a circuit through coil 268 to energize the same and thus to unlock the switch arm 260. With the manual movement of switch arm 260 into engagement with contact 259, the arm 401 is also manually operated into engagement with contact 402 to energize the K-3 relay.

The switch arm 407 of the K-3 relay engages its in contact to connect in the computer output potentiometer, the switch arm 405 engages the computer contact 338 to connect the computer to the amplifier 191, the switch arm 406 engages its in contact to include rebalance potentiometer 225 in the input circuit of amplifier 191, and switch arm 403 engages its in contact to energize the relay winding of relay 88 which opens the circuit to the magnetic clutch 182 and permit the slider of the compass output potentiometer 86 to be spring centered. As the slider 103 of the fader potentiometer moves toward the lower end of resistor portion 106, the control of the autopilot from the computer is gradually introduced until full control is exercised when the slider 103 is at the lower end of resistor portion 106.

The computer may be of such type as to direct automatically the craft over a selected target. After the craft passes over such target, the computer would endeavor to control the craft so that its course would again bring it over the target. In some cases it may be desirable to prevent this control, consequently, the switch 410 for controlling the K-4 relay may be closed during the operation of dropping the bombs on the target.

With the K-4 relay energized, its switch arm 411 breaks the circuit to coil 268 associated with the bombardier selector switch arm 260. The switch arm 260 at this time drops back to unoperated position and is locked therein. In this position it engages contact 258 and switch arm 401 moves off contact 402. Engagement of switch arm 260 with contact 258 causes a reverse movement of the fader motor 251. The movement of arm 401 from contact 402 opens the circuit of the K-3 relay. The deenergization of the K-3 relay again introduces compass control of the craft for automatically stabilizing its heading with manual changes in such heading being provided by the bombardier's potentiometer 90.

The primary purpose in providing the modification shown in Figure 4 is to omit the delay in transferring from compass to computer control which is inherent in the arrangement of Figures 1A and 1B which requires the fader potentiometer slider 103 to move to the dead spot 108 on the potentiometer before the computer control is introduced. Additionally the automatic return of course stabilization from computer to compass is automatically provided by the K-4 relay.

It is now apparent that we have provided a novel control system wherein a plurality of directional stabilizing devices may selectively be utilized to control automatic means for operating the control surfaces of the craft. It is further evident that there has been provided an automatic control system which selectively permits the alternative control of the craft operation from a plurality of direction control devices and such alternative selection is obtained without abrupt operation of the control surfaces.

While many widely different embodiments of the invention could be made without departing from the essence thereof, it is to be understood that this disclosure is merely illustrative of one embodiment of the invention. What is claimed as new is:

1. Apparatus for operating the control surfaces of a dirigible craft comprising: a voltage responsive servo mechanism for controlling operation of said control surfaces; heading stabilizing means for producing a voltage in response to change in heading of said craft; computer means for producing a voltage in proportion to a desired heading; follow-up means for producing a servo mechanism operation limiting voltage; means for selectively applying said voltages to said mechanism including means for shifting control of said voltage responsive servo mechanism from said heading stabilizing means to said computer; and delay means for controlling said servo mechanism from said servo operation limiting voltage and said computer voltage an interval prior to control of said surfaces from said mechanism to prevent abrupt change in heading of said craft.

2. Apparatus for operating power means adapted to adjust control surfaces of a dirigible craft comprising: a voltage responsive servo mechanism for controlling operation of said control surfaces power means; stabilizing means for producing a voltage in response to change in heading of said craft; computer means for producing a voltage in proportion to a desired heading; follow-up means for producing a servo mechanism operation limiting voltage, means for selectively applying said voltages to said mechanism including means for shifting control of said voltage responsive servo mechanism from said stabilizing means to said computer, and means to introduce gradually the controlled proportional operation of said control surfaces power means by said servo mechanism.

3. Control apparatus for an aircraft having control surfaces for controlling the heading thereof comprising: servo means for operating said surfaces; signal responsive means for controlling said servo means; first station means for providing a signal for said signal responsive means; a second station means for providing a signal for said signal responsive means; transfer means at said first station for enabling said second station means to effect control of said signal responsive means; and means for preventing operation of said transfer means while said second station means is providing a signal.

4. Control apparatus for an aircraft having control surfaces for controlling the heading thereof comprising: servo means for operating said surfaces; signal responsive means; connections therefrom to said servo means for operating said servo means; heading stabilizing means for providing a signal; a first station means for providing a signal; connections from the stabilizing means and first station means to said signal responsive means; a second station means for providing a signal; transfer means at said first station for enabling said second station means to effect control of said signal responsive means; and means for preventing operation of said transfer means while said second station means is providing a signal to prevent sudden operation of said servo means; and means for rendering said stabilizing means ineffective to provide a signal upon operation of either said first or second station signal providing means, whereby said heading stabilizing means does not oppose changes in heading from the first or second station.

5. Control apparatus for operating the control surface of a dirigible craft comprising: servo means adapted to move said surface; signal responsive means for controlling said servo means; a manually operated signal producing device; a device for automatically producing a signal in accordance with a desired heading; and motor operated means for shifting control of said signal responsive means from one of said signal devices to said other signal device, said means gradually diminishing the effect of one signal device and subsequently increasing the effect of the other signal device.

6. Control apparatus for operating the control surfaces of a dirigible craft comprising: servo means adapted to move said surfaces; signal responsive means for controlling said servo means; a manually operated signal producing device; a device for automatically producing a signal in accordance with a desired heading; motor operated means for shifting control of said signal responsive means from one of said signal devices to said other signal device, said means gradually diminishing the effect of one signal device and subsequently increasing the effect of the other signal device; and means for preventing initial control of said signal responsive means from said manually operated device until said device has been placed in no signal producing position.

7. Control apparatus for operating the control surfaces of an aircraft comprising: servo means adapted to move said control surfaces; signal voltage responsive means for controlling said servo means; a control transformer having a rotor for producing a voltage in accordance with change in craft heading; computer means for producing a heading control voltage; means for alternatively selectively connecting said computer voltage producing means and said rotor with said signal responsive means; and motor means for placing said rotor in a no signal producing position prior to control of said servo means by said signal voltage responsive means.

8. Control apparatus for operating the control surfaces of an aircraft comprising: servo means adapted to move said control surfaces; means for controlling said servo means; signal voltage responsive means; a control transformer having a rotor for producing a voltage in accordance with change in craft heading; computer means for producing a heading control voltage; means for connecting said computer voltage producing means or said rotor with said signal responsive means; a first and second independent means for operating said servo control means from said signal responsive means while it is under computer or rotor voltage control respectively; and means for maintaining the second means for operating said servo control means in unoperated condition during connection of said computer signal producing means with said signal voltage responsive means.

9. Control apparatus for an aircraft comprising: voltage responsive servo means for controlling the attitude of said craft; stabilizing means for producing a voltage signal; computer means for producing an attitude control voltage; means for connecting either of said voltage producing means with said voltage responsive means; further means for rendering said stabilizing means ineffective to produce a voltage; and transfer means for progressively decreasing the effect of said computer voltage on said voltage responsive means and for rendering said further means ineffective when said computer voltage has no effect on said voltage responsive means.

10. Apparatus for controlling the attitude of an aircraft about an axis thereof alternatively in response to two control devices comprising: means including a device responsive to change in attitude of said craft; operable means for controlling the attitude of said craft; a computer device for predetermining the attitude of said craft; and transfer means coupled to said computer device and said attitude responsive device and said operable means and progressively decreasing the effect of one device and thereafter increasing the effect of the other device on said operable means whereby the attitude of the craft is substantially unchanged between transfer of control effects of said devices on said operable means.

11. Apparatus for controlling the attitude of an aircraft about an axis thereof alternatively in response to two control devices comprising: means including a device responsive to change in attitude of said craft; operable means for controlling the attitude of said craft; a computer device for predetermining the attitude of said craft; and transfer means coupled to said computer device and said attitude responsive device and said operable means and progressively decreasing the effect of one device and thereafter increasing the effect of the other device on said operable means whereby the attitude of the craft is substantially unchanged between transfer of control effects of said devices on said operable means; and manually actuable means for controlling said operable means and effective on operation to render said attitude responsive means ineffective on said operable means.

12. Apparatus for controlling the attitude of an aircraft about its turn axis selectively in response to a plurality of signal devices, said apparatus comprising: means including a signal device responsive to change in heading of said craft; a computer signal device for predetermining the heading of said craft; a manually operable signal device for selecting the heading of said craft; operable means for controlling the attitude of said craft; and transfer means coupled to said computer signal device on the one hand and said attitude responsive device and said manually operable signal device on the other hand and progressively decreasing the effect of the one signal device on the one hand and thereafter increasing the effect of the other two signal devices on the other hand on said operable means whereby the attitude of the craft is substantially unchanged between transfer of control effects of said signal devices on said operable means.

13. Apparatus for controlling the attitude of an aircraft about the turn axis thereof alternatively in response to two control devices comprising: a first voltage producing device responsive to change in heading of said craft; a computer device for producing a signal voltage in accordance with a predetermined heading of said craft; potential responsive means for controlling the attitude of said craft about the turn axis; and transfer means coupled to said computer device, said attitude responsive device, and said operable means and progressively decreasing the effect of one device and thereafter increasing the effect of the other device on said potential responsive means whereby the attitude of the craft about the turn axis is substantially unchanged between transfer of control effects of said voltage producing devices on said voltage responsive means; and manually operable means for producing a voltage signal in accordance with desired changes in heading and connected in parallel with said attitude responsive device to said transfer means; and means for rendering said attitude responsive signal generator ineffective during operation of said manually operable voltage producing device.

JOHN W. ANDERSON.
ROBERT R. CHAPMAN.

References Cited in the file of this patent
UNITED STATES PATENTS

| Number | Name | Date |
|---|---|---|
| 2,410,468 | Van Auken et al. | Nov. 5, 1946 |
| 2,429,642 | Newton | Oct. 28, 1947 |
| 2,450,907 | Newton et al. | Oct. 12, 1948 |
| 2,466,702 | Hamby | Apr. 12, 1949 |
| 2,515,349 | Kutzler et al. | July 18, 1950 |